(12) United States Patent
Miao

(10) Patent No.: US 11,033,817 B2
(45) Date of Patent: Jun. 15, 2021

(54) INFORMATION PROCESSING METHOD AND APPARATUS, STORAGE MEDIUM AND ELECTRONIC DEVICE

(71) Applicant: NETEASE (HANGZHOU) NETWORK CO., LTD., Zhejiang (CN)

(72) Inventor: Qingbo Miao, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/136,284

(22) Filed: Sep. 20, 2018

(65) Prior Publication Data

US 2019/0111342 A1    Apr. 18, 2019

(30) Foreign Application Priority Data

Oct. 13, 2017    (CN) .......................... 201710954223.5

(51) Int. Cl.

| A63F 13/426 | (2014.01) |
|---|---|
| A63F 13/5372 | (2014.01) |
| A63F 13/5375 | (2014.01) |
| G06F 3/0481 | (2013.01) |
| A63F 13/2145 | (2014.01) |

(Continued)

(52) U.S. Cl.
CPC ........ *A63F 13/426* (2014.09); *A63F 13/2145* (2014.09); *A63F 13/5255* (2014.09); *A63F 13/5372* (2014.09); *A63F 13/5375* (2014.09); *A63F 13/95* (2014.09); *G06F 3/0481* (2013.01); *G06T 11/001* (2013.01); *G06T 11/60* (2013.01); *G06T 2200/24* (2013.01)

(58) Field of Classification Search
CPC ................ A63F 13/426; A63F 13/2145; A63F 13/5255; A63F 13/5372; A63F 13/5375; A63F 13/95; G06F 3/0481; G06T 11/001; G06T 11/60; G06T 2200/24
See application file for complete search history.

(56) References Cited

U.S. PATENT DOCUMENTS

2011/0265041 A1*  10/2011  Ganetakos ............ A63F 13/533
                                                                    715/834

FOREIGN PATENT DOCUMENTS

| CN | 104740876 A | 7/2015 |
|---|---|---|
| CN | 105194873 A | 12/2015 |
| CN | 107185242 A | 9/2017 |

OTHER PUBLICATIONS

Fallout New Vegas—Ultimate Edition—Game Manual, 2010, Bethesda Softworks. (Year: 2010).*

(Continued)

*Primary Examiner* — Werner G Garner
(74) *Attorney, Agent, or Firm* — Gang Yu

(57) ABSTRACT

An information processing method and apparatus, a storage medium, and an electronic device are provided. The method includes: a direction indicator is provided on the GUI, the direction indicator including a direction identifier for identifying a direction; a location marking operation is detected, a marking location is determined in the game scene according to the location marking operation, and direction information of the marking location is acquired; and a graphical identifier corresponding to the marking location is generated at a position corresponding to the direction indicator according to the direction information.

18 Claims, 3 Drawing Sheets

(51) Int. Cl.
  *A63F 13/95*     (2014.01)
  *A63F 13/5255*   (2014.01)
  *A63F 13/42*     (2014.01)
  *G06T 11/00*     (2006.01)
  *G06T 11/60*     (2006.01)

(56) References Cited

OTHER PUBLICATIONS

Greymonk, "Stupid question: How do you remove a map marker once it's placed? (PC)", reddit.com, 2015, available at <<https://www.reddit.com/r/Fallout/comments/3smj0r/stupid_question_how_do_you_remove_a_map_marker/>>. (Year: 2015).*

Cliffs of Dover—Il-2 Sturmovik—Pilot's Notes—Special Edition, Jan. 31, 2011, Ubisoft Entertainment. (Year: 2011).*

Vault Dweller's Survival Guide, 2009, Bethesda Softworks LLC. (Year: 2009).*

Somethin123, "how do i get rid of this stupid place marker??", 2009, available at <<https://gamefaqs.gamespot.com/boards/939933-fallout-3/47789635>>. (Year: 2009).*

DCS A-10C Warthog—Flight Manual, 2011, Eagle Dynamics. (Year: 2011).*

Wirrew, "Battlefield 3 #INGAME HUD", Apr. 14, 2012, deviantart.com, available at <<https://www.deviantart.com/wirrew/art/Battlefield-3-INGAME-HUD-296117099>>. (Year: 2012).*

Wirrew, "The Battlefield 3 GUI Concept 2.0 #INGAME HUD" (screenshot), Apr. 14, 2012, deviantart.com, available at <<https://www.deviantart.com/wirrew/art/Battlefield-3-INGAME-HUD-296117099>>. (Year: 2012).*

Larryn Bell, World of Tanks Minimap and Circles Explained, Jun. 7, 2017, available at <<https://ag.hyperxgaming.com/article/4612/world-of-tanks-minimap-and-circles-explained>>. (Year: 2017).*

Chai, Junge: "The Exploration and Application of Scene Design in Mobile Adventure Game", China Master's Theses Full-text Database (Electronic Journals), May 31, 2017 (May 31, 2017), abstract and pp. 30-59.

Bilibili: "Skydiving and choosing maps are also very particular. Chicken must, Novice of PlayerUnknown's Battlegrounds must see", Oct. 3, 2017(Oct. 3, 2017).

Cai, Liyuan: "The Design and Implementation of a 'xianjian' Mobile Game Based on ARPG", China Master's Theses Full-text Database (Electronic Journals), May 31, 2017 (May 31, 2017), abstract and pp. 30-41.

Bilibili: "Latest notice of Fallout 4", Jul. 27, 2015(Jul. 27, 2015).

* cited by examiner

INFORMATION PROCESSING METHOD AND APPARATUS, STORAGE MEDIUM AND ELECTRONIC DEVICE

CROSS-REFERENCE TO RELATED APPLICATIONS

The present disclosure claims priority of Chinese Patent Application No. 201710954223.5, filed to China Patent Office on Oct. 13, 2017. Contents of the present disclosure are hereby incorporated by reference in entirety of the Chinese Patent Application.

TECHNICAL FIELD

The present disclosure relates to the technical field of human-computer interaction, and in particular to an information processing method and apparatus, storage medium and electronic device.

BACKGROUND

In games, especially in games with large maps (also called big scenes), if players are not familiar enough with a game map, they are easy to get lost in the game map and cannot reach the destination. Existing games generally adopt an automatic path finding to solve a problem of getting lost in the big map. That is, after the player determines the destination, the game controls a virtual character to automatically move to the destination.

The automatic path finding solves the problem of getting lost, but during a process of controlling the virtual character to move to the destination, the system need to have a complete control of a movement of the virtual character, and any control from the player can interrupt the automatic path finding, which may result in a poor experience.

SUMMARY

At least some embodiments of the present disclosure provide an information processing method and apparatus, a storage medium and electronic device.

In one embodiment of the present disclosure, an information processing method is applied to a mobile terminal which is rendered with a graphical user interface (GUI), contents rendered on the GUI at least partially includes a game scene and at least partially includes a virtual character. The method includes:

providing a direction indicator on the GUI, the direction indicator including a direction identifier for identifying a direction;

detecting a location marking operation, determining a marking location in the game scene according to the location marking operation, and acquiring direction information of the marking location; and at a position corresponding to the direction identifier corresponding to the direction information, generating a graphical identifier corresponding to the direction information of marking location.

In another embodiment of the present disclosure, an information processing apparatus is applied to a mobile terminal which is rendered with a GUI, contents rendered on the GUI at least partially includes a game scene and at least partially includes a virtual character, the apparatus including:

a direction indicator component, configured to provide a direction indicator on the GUI, the direction indicator including a direction identifier for identifying a direction;

a detection acquisition component, configured to detect a location marking operation, determine a marking location in the game scene according to the location marking operation, and acquire direction information of the marking location; and a control component, configured to, at a position corresponding to the direction identifier corresponding to the direction information, generate a graphical identifier corresponding to the marking location.

In another embodiment of the present disclosure, a computer-readable storage medium is provided, on which at least one computer program is stored, the at least one computer program being executed by at least one processor to implement the following steps:

providing a direction indicator on the GUI, the direction indicator including a direction identifier for identifying a direction;

detecting a location marking operation, determining a marking location in the game scene according to the location marking operation, and acquiring direction information of the marking location; and at a position corresponding to the direction identifier corresponding to the direction information, generating a graphical identifier corresponding to the marking location.

In another embodiment of the present disclosure, an electronic device is provided, which includes:

at least one processor; and at least one memory, configured to store at least one executable instruction of the at least one processor, and the at least one processor is configured to execute the above information processing method by executing the at least one executable instruction.

DETAILED DESCRIPTION

Figure 1:
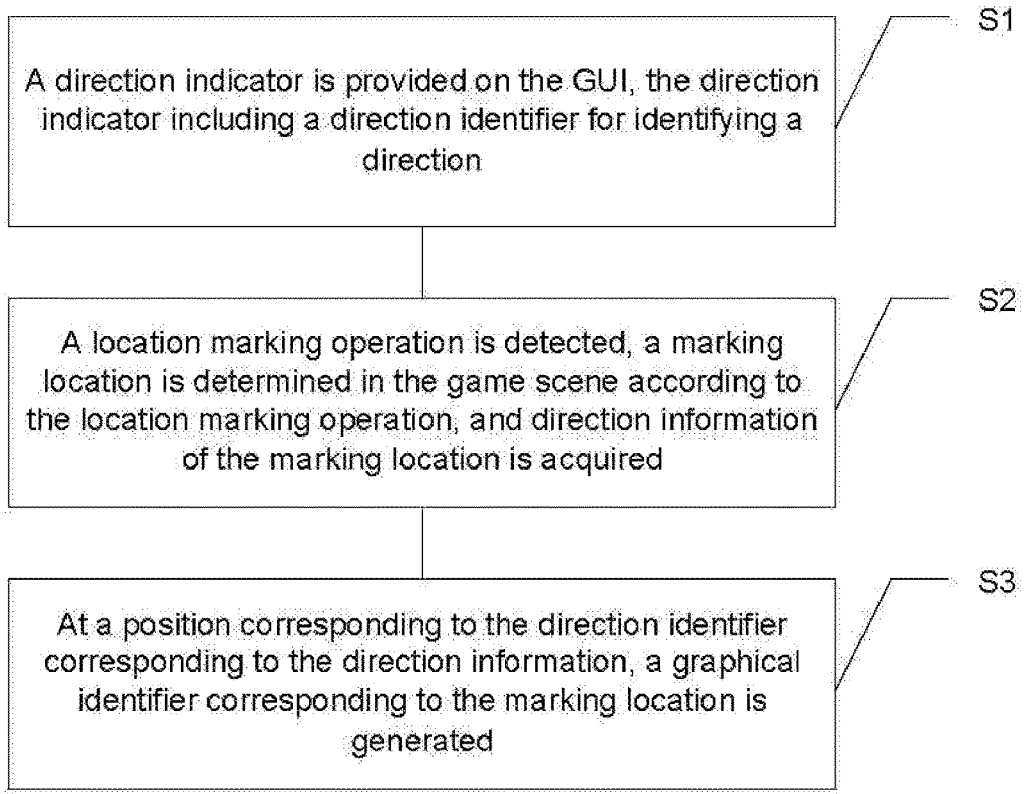
FIG. 1 is a flowchart of an information processing method according to an embodiment of the present disclosure.

Exemplary embodiments will now be described more comprehensively with reference to the drawings. However, the exemplary embodiments may be implemented in various forms and should not be understood to be limited to embodiments elaborated herein. On the contrary, these embodiments are provided to make the present disclosure comprehensive and complete and make the concept of the exemplary embodiments delivered to those skilled in the art comprehensively. The same reference numerals in the drawings denote the same or similar parts, and the repeated description thereof will be omitted.

In addition, described characteristics, structures or properties may be combined into one or more embodiments in any appropriate manner. Many specific details are provided in the following descriptions, thereby providing an adequate understanding to the embodiments of the present disclosure. However, those skilled in the art should realize that the technical solutions of the present disclosure may be implemented without one or more of the specific details, or other methods, components, materials, apparatuses, steps and the like may be adopted. Under other circumstances, well-known structures, methods, apparatuses, implementations, materials or operations are not shown or described in detail to avoid each aspect of the present disclosure being obscured.

The block diagrams shown in the figures are functional entities and do not necessarily have to correspond to physically separate entities. That is, these functional entities may be implemented in software, or these functional entities or some of the functional entities are implemented in one or more software-hardened components, or these functional entities are implemented in different networks and/or processor apparatuses and/or microcontroller apparatuses.

In one embodiment of the present disclosure, an information processing method is applied to a mobile terminal which is rendered with a GUI, and contents rendered on the GUI at least partially includes a game scene and at least partially includes a virtual character. The mobile terminal may be an electronic device having a touch screen such as a mobile phone, a tablet computer, a game machine, or a Personal Digital Assistant (PDA). A game application, a virtual character, a virtual joystick area, a virtual battle scene, a virtual natural environment and the like are displayed on the touch screen of the mobile terminal. The GUI may be an entire area of the touch screen or a partial area of the touch screen, which is not specifically limited in the exemplary embodiment. The virtual character is controlled by a player and is rendered on the GUI partially or entirely. For example, in a first person perspective, contents rendered on the GUI is presented in a main control perspective of the player, an immersive experience of the player is enhanced, and part of the virtual character, such as hands or feet of the virtual character, is rendered on the GUI. However, in a third person perspective, the virtual character may be rendered on the GUI as a whole, thereby reducing control difficulty and sense of vertigo of the player, and laying more emphasis on sense of motion of a game screen. A developer may choose a specific display mode according to contents to be rendered on the GUI, and the present disclosure is not limited to this. As shown in FIG. 1, the information processing method may include the steps as follows.

At step S1, a direction indicator is provided on the GUI, the direction indicator including a direction identifier for identifying a direction.

At step S2, a location marking operation is detected, a marking location is determined in the game scene according to the location marking operation, and direction information of the marking location is acquired.

At step S3, at a position corresponding to the direction identifier corresponding to the direction information, a graphical identifier corresponding to the direction information of the marking location is generated.

With providing the direction indicator on the GUI, the direction corresponding to the marking location is identified on the direction indicator by the graphical identifier according to the direction information of the marking location, so that the player can determine the direction of the marking location using the direction indicator, and avoids getting lost in a game map.

Furthermore, since a direction rather than a specific location is identified by the direction indicator, compared with a manner of directly marking the specific location in a thumbnail of the game scene, the method of the present embodiment cannot be affected by a distance between the marking location and the virtual character, and the present embodiment may display an accurate direction on the indicator regardless of the distance. By directly marking the specific location in the thumbnail, it may cause that displaying of the specific location cannot be realized since a distance between the marking location and a start location exceeds a preset distance and the marking location is outside a current display area of the thumbnail. Or, it is necessary to decrease a scale of the thumbnail to display the marking location, so that the marking accuracy is too low to have an accurate reference value.

Hereinafter, the information processing method in the present exemplary embodiment will be further described with reference to FIG. 1 to FIG. 6.

At step S1, the direction indicator is provided on the GUI, the direction indicator including a direction identifier for identifying a direction.

Figure 2:
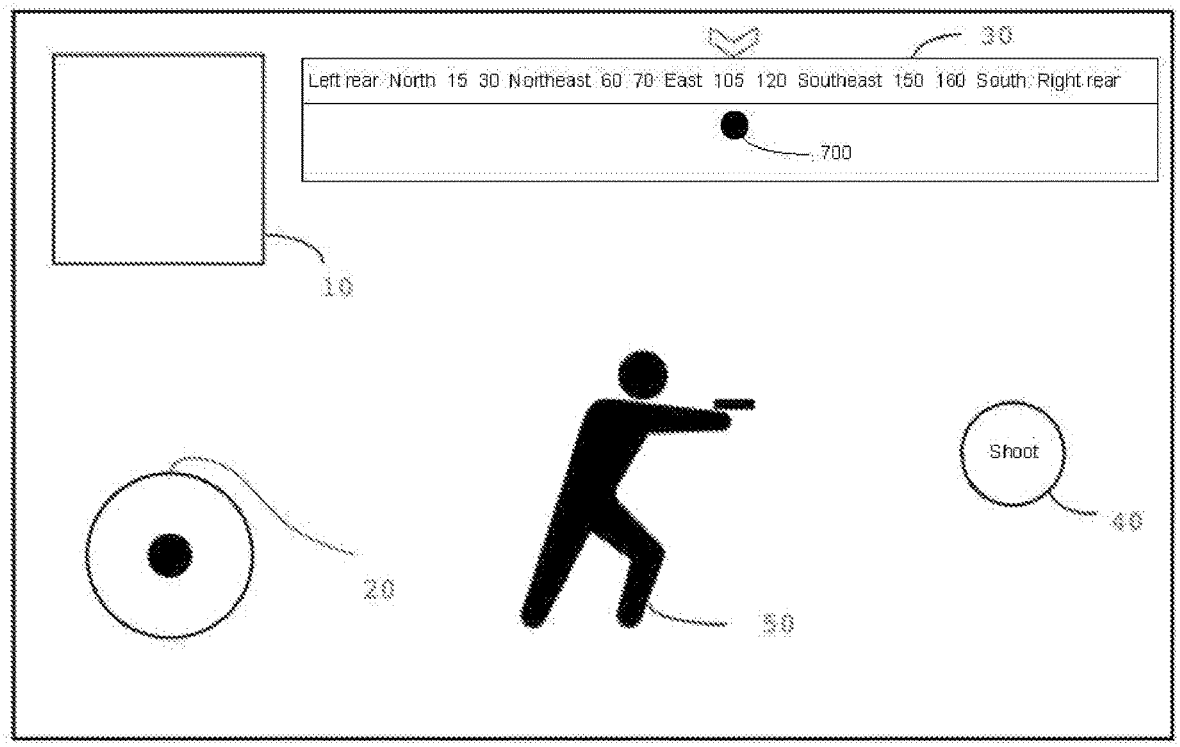
FIG. 2 is a schematic diagram of a GUI according to an exemplary embodiment of the present disclosure.
Figure 3:
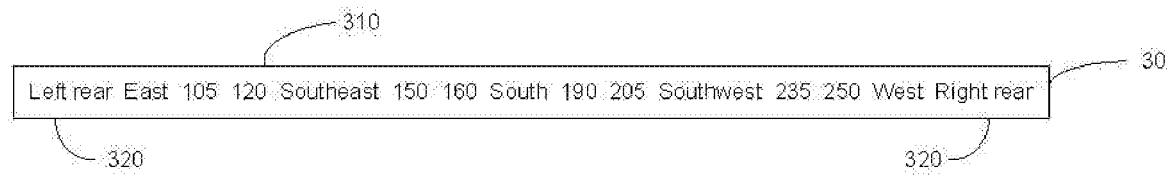
FIG. 3 is a structural schematic diagram of a direction indicator according to an exemplary embodiment of the present disclosure.

In the exemplary embodiment shown in FIG. 2, the GUI includes a moving control area 20 for controlling movement of a virtual character 50, a skill control 40 for controlling skill release, and a thumbnail 10 of the game scene for displaying a thumbnail game scene. The present exemplary embodiment provides a direction indicator 30 on the GUI. The direction indicator 30 includes the direction identifier for identifying the direction, and the direction identifier may include at least one of the following: a direction scale and a direction descriptor. The direction indicator 30 shown in FIG. 3 includes both a direction scale 310 represented by a numeral and a direction scale 310 represented by a text, and a direction descriptor 320. For example, numerals 105, 120, 150, etc. on the direction indicator are direction scales 310 represented by numerals, and texts east, southeast, south, southwest, etc. on the direction indicator are direction scales 310 represented by texts. The direction descriptor may adopt a text description mode or a graphic description mode. FIG. 2 shows a direction indicator 30 including a text descriptor, and the leftmost side displays "left rear", and the rightmost side displays "right rear". On the one hand, the direction descriptor reduces understanding difficulty of the direction indicator for the player; and on the other hand, due to the limited space of the screen, it may be difficult to display all scale ranges of 0-360 degrees of the direction indicator on the screen. Thus, details of partial scale area focused by players may be displayed on the screen, while other partial scale areas may be summarily displayed by the direction descriptor. In the exemplary embodiment shown in FIG. 3, the area behind the virtual character is summarily divided into a left rear area and a right rear area.

The direction indicator 30 may be in a form of a indicator as shown in FIG. 2, or may be in other forms that may indicate a direction, such as a simulated compass or an arc dial.

At step S2, the location marking operation is detected, the marking location is determined in the game scene according to the location marking operation, and the direction information of the marking location is acquired.

In the present exemplary embodiment, the location marking operation of the player may be performed in various ways, for example:

In the exemplary embodiment as shown in FIG. 2, an operation of clicking the thumbnail 10 of the game scene may be taken as the location marking operation, and a position corresponding to a click location detected by the thumbnail 10 of the game scene is taken as the marking location. This mode is suitable for a case where display content of the thumbnail is thumbnail information of the entire game scene, because if the thumbnail displays a part of the game scene, the player cannot click to select the portion of the game scene that is not displayed.

Figure 4:
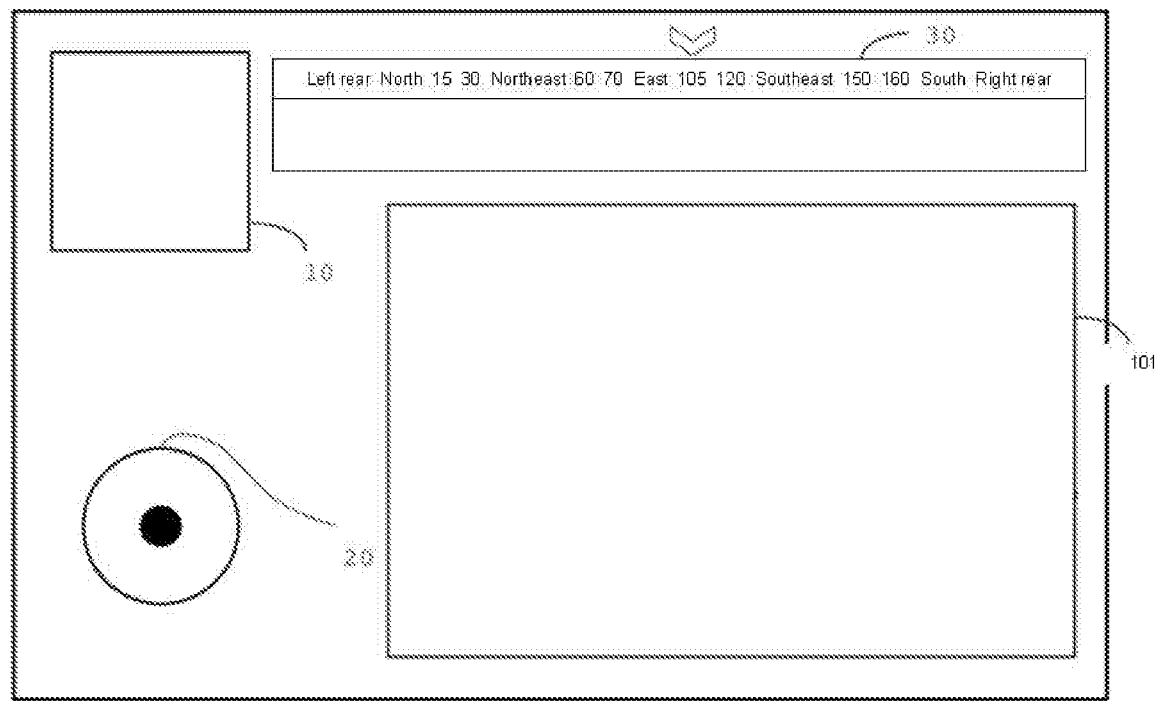
FIG. 4 is a schematic diagram of a GUI of a location marking operation state according to an exemplary embodiment of the present disclosure.

In the exemplary embodiment as shown in FIG. 4, for the case where the thumbnail 10 of the game scene displays thumbnail information of the partial game scene, a thumbnail 101 of a game panorama (i.e., a map of thumbnail information of the entire game scene) may be opened based on a preset operation (for example, an operation of clicking the thumbnail) of the player. Then, a touch operation of the player on the thumbnail of the game panorama (such as click, double click, long-press or pop-press) is taken as a location marking operation, and a position corresponding to the touch operation location in the game scene is taken as the marking location.

As an alternative embodiment, there may be more than two marking locations. That is, the player may mark more than two marking locations.

Similarly, as an alternative embodiment, there may be only one marking location. For example, whenever the location marking operation is detected, an existing marking location is eliminated, and the marking location is re-determined by a current location marking operation.

In an alternative embodiment, the marking location eliminating control is provided on the GUI; and in response to a trigger operation acting on the marking location, eliminating control is detected, the marking location and the graphical identifier corresponding to the marking location are eliminated.

When the marking location is determined, the direction information of the marking location is acquired. In one embodiment, the direction information type includes a relative direction information which is a direction information of the marking location relative to the virtual character (for example, a virtual character controlled by the player), or a direction information of the marking location in the game scene. In another embodiment, the direction information type includes both the relative direction information and the direction information of the marking location in the game scene. The type of the direction information displayed in the scene game may be determined according to an operation of a game developer or the player. On the one hand, a type of corresponding direction information may be selected according to information needed to be displayed by the player. For example, if the relative direction of the marking location relative to the virtual character needs to be identified, the relative direction may be selected, and otherwise, the direction information of the marking location in the game scene may be acquired. On the other hand, the selection may be performed according to convenience of data acquisition from a game engine, and if it is more convenient to acquire the relative direction, the relative direction may be adopted. In addition, since the marking location and the virtual character may be in a same coordinate system in the game scene, furthermore, the relative direction and a direction in the game scene may be mutually convertible. The direction of the marking location may also be calculated basing on coordinate information of the marking location, and the developer may also calculate the direction information according to the acquired coordinate information.

At step S3, at a position corresponding to the direction identifier corresponding to the direction information, the graphical identifier corresponding to the direction information of the marking location is generated.

As described above, the direction information may be the relative direction of the marking location relative to the virtual character, or may be the direction information of the marking location in the game scene. For ease of explanation, the present embodiment is illustrated by taking the direction information of the marking location in the game scene as an example in the present embodiment. In the exemplary embodiment as shown in FIG. 2, a circular graphic identifier 700 is generated at a position of 105 degrees southeast of the direction indicator, indicating that the marking location is located at a direction of 105 degrees southeast of the game scene.

As an alternative embodiment, not only the relative direction information of the marking location relative to the virtual character may be acquired, but also the relative distance of the marking location relative to the virtual character may be acquired. Moreover, a display form of the corresponding graphical identifier may be controlled according to the distance. In an optional embodiment, at least one of following parameters of the graphical identifier: a size, a color, brightness, a transparency and a dynamic effect is controlled. For example, the size of the graphic identifier 700 corresponds to the distance size.

In the present exemplary embodiment, the corresponding graphic identifier 700 may be controlled based on the relative distance of the marking location relative to the virtual character in the following manners.

In manner 1, the transparency of the graphical identifier is controlled basing on the relative distance of the marking location relative to the virtual character.

In the present exemplary embodiment, the transparency of the graphical identifier is negatively correlated to the distance between the marking location and the virtual character. That is, the longer the relative distance of the marking location relative to the virtual character is, the higher the transparency of the graphical identifier is, and also, the shorter the relative distance of the marking location relative to the virtual character is, the lower the transparency of the graphical identifier is. It is to be noted that the transparency of the graphical identifier is within a range of 100% to 0%. And when the transparency of the graphical identifier is 100%, the graphical identifier is totally transparent, and when the transparency of the graphical identifier is 0%, the graphical identifier is totally non-transparent.

In manner 2, the size of the graphical identifier is controlled based on the relative distance of the marking location relative to the virtual character.

In the present exemplary embodiment, the size of the graphical identifier is negatively correlated to the distance between the marking location and the virtual character. That is, the longer the relative distance of the marking location relative to the virtual character is, the smaller the size of the graphical identifier is, and also, the shorter the relative distance of the marking location relative to the virtual character is, the larger the size of the graphical identifier is.

In manner 3, the brightness of the graphical identifier is controlled based on the relative distance of the marking location relative to the virtual character.

In the present exemplary embodiment, the brightness of the graphical identifier is negatively correlated to the distance between the marking location and the virtual character. That is, the longer the relative distance of the marking location relative to the virtual character is, the lower the brightness of the graphical identifier is. And also the shorter the relative distance of the marking location relative to the virtual character is, the higher the brightness of the graphical identifier is.

It is to be noted that the display form may be at least one of following parameters of the graphical identifier: a size, a color, brightness, a transparency and a dynamic effect. In another word, the display form may consist of a color and a transparency, or consist of a color and brightness. The corresponding graphical identifier is controlled according to the distance. And the parameters mentioned may be adjusted basing on the relative distance.

As an alternative embodiment, the direction indicator is further configured to indicate a current orientation of the virtual character in the game scene. For example, a forward direction of the virtual character under a current state is identified. The current orientation of the virtual character may be identified by using the same method as the method for identifying the marking location. For example, a graphical identifier, a representation of the virtual character, is generated at a position corresponding to the direction indicator.

Figure 5:
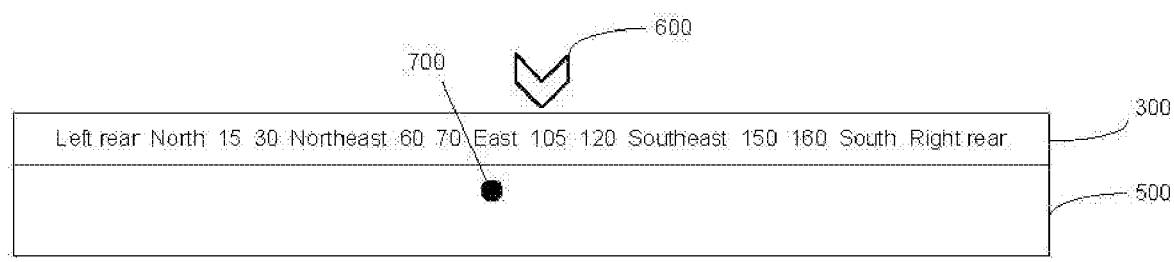
FIG. 5 is a schematic diagram of a marking state of a direction indicator when a virtual character is oriented 105 degrees southeast according to an exemplary embodiment of the present disclosure.
Figure 6:
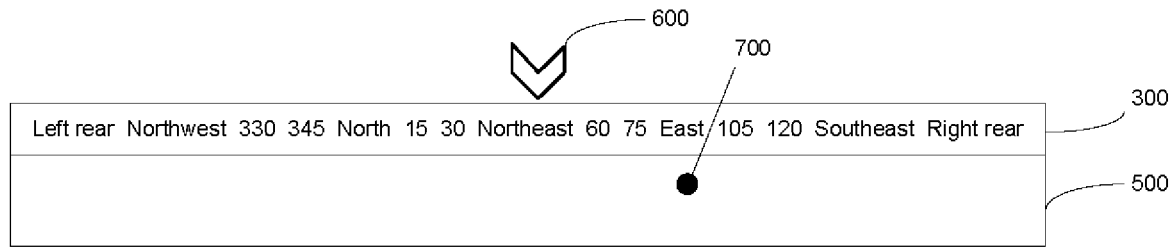
FIG. 6 is a schematic diagram of a marking state of a direction indicator when a virtual character is oriented to the northeast according to an exemplary embodiment of the present disclosure.

In the exemplary embodiment as shown in FIG. 2 and FIG. 5, an orientation indication control 600 may be rendered on the GUI, and the direction indicator 30 is controlled to move in the GUI according to the current orientation, such that a position corresponding to the current orientation on the direction indicator 30 is at an indication location of the orientation indication control 600. In the present embodiment, a position of the orientation indication control 600 is fixed, and an orientation of the virtual character is always the direction pointed by the orientation indication control 600 through moving the direction indicator. In such a way, the orientation indication control 600 may provide direction reference information for the player while indicating the orientation. When the graphical identifier 700 of the marking location is at a position indicated by the orientation indication control 600, it is indicated that the marking location is right forward the current orientation of the virtual character. When the graphical identifier 700 of the marking location is on the right side of the indication location of the orientation indication control 600, it is indicated that the marking location is on the right side of the current orientation of the virtual character. When the graphical identifier 700 of the marking location is on the left side of the indication location of the orientation indication control 600, it is indicated that the marking location is on the left side of the current orientation of the virtual character. Therefore, it is convenient for the player to control the orientation of the virtual character to determine the moving direction to approach or move away from the marking location. For example, the indication location of the orientation indication control 600 in FIG. 5 is 105 degrees southeast, which indicates that the current orientation of the virtual character is 105 degrees southeast. At this time, the graphic identifier 700 is located on the due east scale of the direction indicator, and is located at the left side of the orientation indication control 600, which indicates that the marking location is on the left side of the virtual character. When the virtual character is rotated to the left to the northeast orientation, as shown in FIG. 6, the direction indicator 30 moves in the GUI, such that the northeast orientation is located at the indication location of the orientation indication control 600. At this time, the graphical identifier 700 of the due east direction is located on the right side of the orientation indication control 600 due to the movement of the direction indicator 30, which indicates that the marking location is on the right side of the virtual character.

The orientation indication control 600 may take a form of a triangle, an arrow or other graphic styles, which is not limited in the present disclosure.

In an alternative embodiment, when the contents rendered on the GUI further includes a thumbnail of the game scene for displaying thumbnail information of the entire or partial game scene, the marking location may also be marked in the thumbnail of the game scene while being identified on the direction indicator.

In the exemplary embodiment of the present disclosure, an information processing apparatus is also applied to a mobile terminal which is rendered with a GUI, contents rendered on the GUI at least partially includes a game scene and at least partially includes a virtual character. The apparatus includes:

a direction indicator component, configured to provide a direction indicator on the GUI, the direction indicator including a direction identifier for identifying a direction;

a detection acquisition component, configured to detect a location marking operation, determine a marking location in the game scene according to the location marking operation, and acquire direction information of the marking location; and a control component, configured to, at a position corresponding to the direction identifier corresponding to the direction information, generate a graphical identifier corresponding to the marking location.

The specific details of the components in the above information processing apparatus have been described in detail in the corresponding information processing method, and therefore will not be described here.

It should be noted that although several components or elements of the device for execution are mentioned in the above detailed description, such division is not mandatory. In fact, according to the implementation manners of the present disclosure, the features and functions of two or more components or elements described above may be embodied in one component or element. Conversely, the features and functions of one component or element described above may be further divided into multiple components or elements and embodied.

The present disclosure also provides a computer-readable storage medium, on which at least one computer program is stored, and the at least one computer program is executed by at least one processor to implement the information processing method. The method includes the following steps:

providing a direction indicator on the GUI, the direction indicator including a direction identifier for identifying a direction;

detecting a location marking operation, determining a marking location in the game scene according to the location marking operation, and acquiring direction information of the marking location; and at a position corresponding to the direction identifier corresponding to the direction information, generating a graphical identifier corresponding to the marking location.

The present disclosure also provides an electronic device, includes: at least one processor; and at least one memory, configured to store at least one executable instruction of the at least one processor, and the at least one processor is configured to execute the executable instruction to perform the information processing method. The method includes the following steps:

providing a direction indicator on the GUI, the direction indicator including a direction identifier for identifying a direction;

detecting a location marking operation, determining a marking location in the game scene according to the location marking operation, and acquiring direction information of the marking location; and at a position corresponding to the direction identifier corresponding to the direction information, generating a graphical identifier corresponding to the marking location.

Figure 7:
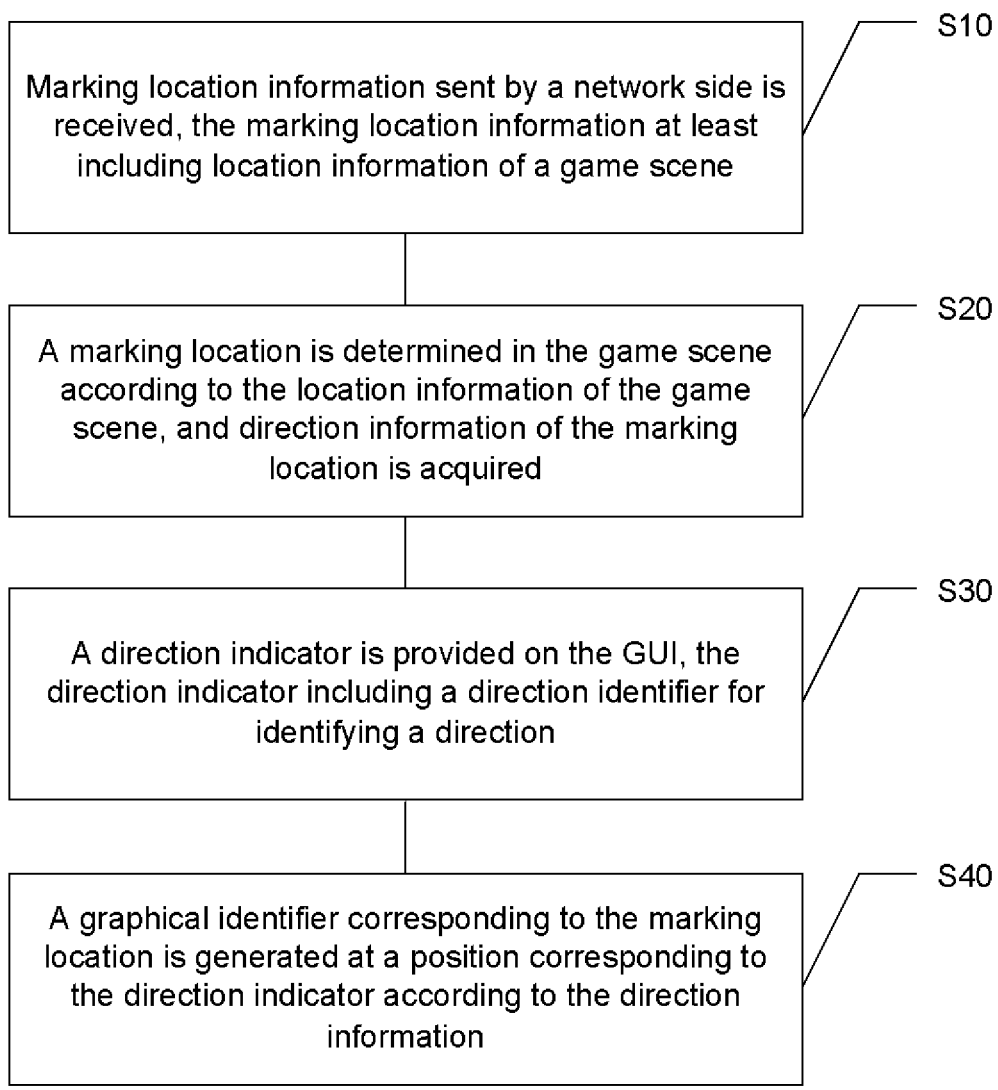
FIG. 7 is a flowchart of an information processing method according to another embodiment of the present disclosure.

The foregoing information processing method, information processing apparatus, computer-readable storage medium and electronic device of the present disclosure are also applicable to a multiplayer online game, in which players send marking locations to each other. That is, when a mobile terminal worked as a send-side detects the location marking operation and determines the marking location, the send-side sends marking location information to a mobile terminal worked as a receive-side through a network, for example, the send-side may send marking location information to the receive-side directly, or a server forward the marking location information sent by the send-side to the receive-side. The information at least includes location information of the marking location in the game scene. After receiving the marking location information, the receive-side determines the marking location in the local game scene, and then identifies the direction of the marking location by using the direction indicator according to the foregoing method. As shown in FIG. 7, specifically, for the mobile terminal on the receive-side, the information processing method is as follows.

At step S10, marking location information sent by a network side is received, the marking location information at least including location information of a game scene.

At step S20, a marking location is determined in the game scene according to the location information of the game scene, and direction information of the marking location is acquired.

At step S30, a direction indicator is provided on the GUI, the direction indicator including a direction identifier for identifying a direction.

At step S40, a graphical identifier corresponding to the marking location is generated at a position corresponding to the direction indicator according to the direction information.

In view of the foregoing detailed description of the present disclosure by steps S1, S2, and S3, the difference between the present embodiment and the foregoing is mainly that, in the present embodiment, the marking location on a local side is determined according to the marking location information sent by the network side. The embodiment described above is that the local side determines the marking location according to the location marking operation executed on the local side. Steps S30 and S40 of the present embodiment may adopt the solution consistent with steps S1 and S3 in the foregoing, in order to avoid redundancy, the following discloses contents that are not described above in detail, and the content already described above is not repeated here.

In an optional embodiment, at step S10, the marking location information sent by the network side includes: marking location information directly sent by other mobile terminals through the network, and marking location information forwarded by a game server after being sent from other mobile terminals to the game server. The present disclosure is not limited, and the developer may make a choice according to the needs of the game.

The location information of the game scene in the marking location information may be a specific coordinate or a relatively blurred location, such as a specific building model.

Since marking location information sent by different terminals may be received in a multiplayer online game, in order to distinguish from different senders, the marking location information may further includes an identifier of each sender, so that the display form of the corresponding graphical identifier may be controlled according to the identifier of each sender. That is, at least one of following parameters of the graphical identifier: a size, a color, brightness, a transparency and a dynamic effect is controlled according to the identifier of each sender. For example, graphical identifiers corresponding to marking locations sent by different terminals are represented by different colors respectively.

In an alternative embodiment, after receiving the marking location information, it is determined whether the marking location corresponding to the identifier of each sender already exists according to the identifier of each sender. If so, the existing marking location is eliminated, and a new marking location corresponding to a specific sender is re-determined.

Correspondingly, the present embodiment also provides an information processing apparatus applied to a receiving side. The apparatus includes:

a receiving component, configured to receive marking location information sent by a network side, the marking location information at least including location information of a game scene;

a marking location determination component, configured to determine a marking location in the game scene according to the location information of the game scene, and acquire direction information of the marking location;

a direction indicator component, configured to provide a direction indicator on the GUI, the direction indicator including a direction identifier for identifying a direction;

a control component, configured to, at a position corresponding to the direction identifier corresponding to the direction information, generate a graphical identifier corresponding to the marking location.

Correspondingly, the present embodiment also provides a computer-readable storage medium applied to a receiving side, on which at least one computer program is stored, and the at least one computer program is executed by at least one processor to implement the information processing method. The method includes the following steps:

receiving marking location information sent by a network side, the marking location information at least including location information of a game scene;

determining a marking location in the game scene according to the location information of the game scene, and acquiring direction information of the marking location;

providing a direction indicator on the GUI, the direction indicator including a direction identifier for identifying a direction;

at a position corresponding to the direction identifier corresponding to the direction information, generating a graphical identifier corresponding to the marking location.

Correspondingly, the present embodiment also provides an electronic device applied to a receiving side, includes: at least one processor; and at least one memory, configured to store at least one executable instruction of the at least one processor, and the at least one processor is configured to execute the at least one executable instruction to perform the information processing method. The method includes the following steps:

receiving marking location information sent by a network side, the marking location information at least including location information of a game scene;

determining a marking location in the game scene according to the location information of the game scene, and acquiring direction information of the marking location;

providing a direction indicator on the GUI, the direction indicator including a direction identifier for identifying a direction;

at a position corresponding to the direction identifier corresponding to the direction information, generating a graphical identifier corresponding to the marking location.

Those skilled in the art will appreciate that various aspects of the present disclosure may be implemented as a system, method, or program product. Therefore, various aspects of the present disclosure may be embodied in the form of a complete hardware implementation manner, a complete software implementation manner (including firmware, microcode, etc.), or a combined implementation manner of hardware and software, which may be collectively referred to as "circuit", "component" or "system".

Other embodiments of the present disclosure will be apparent to those skilled in the art after considering the specification and practicing the present disclosure herein. The present application is intended to cover any variations, uses, or adaptations of the present disclosure, which are in accordance with the general principles of the present disclosure and include common general knowledge or conventional technical means in the art that are not disclosed in the present disclosure. The specification and examples are to be regarded as illustrative only, and the true scope and spirit of the present disclosure are limited only by the appended claims.

What is claimed is:

1. An information processing method, applied to a mobile terminal which is rendered with a graphical user interface (GUI), contents rendered on the GUI at least partially comprising a game scene, a thumbnail of the game scene used for displaying thumbnail information of an entire or partial game scene, and at least partially comprising a virtual character, the method comprising:
   providing a direction indicator on the GUI, the direction indicator comprising a direction identifier for identifying a direction;
   detecting a location marking operation on the thumbnail, determining a marking location in the game scene according to a position of the location marking operation on the thumbnail, and acquiring direction information of the marking location; and
   at a position of the direction indicator corresponding to the direction identifier corresponding to the direction information, generating a graphical identifier corresponding to the direction information of the marking location;
   wherein the GUI displays the thumbnail of the game scene as a same time as showing the direction indicator and the game scene;
   wherein when the direction information comprises relative direction information of the marking location relative to the virtual character, the method further comprises: acquiring a relative distance of the marking location determined by the position of the location marking operation on the thumbnail relative to the virtual character, and controlling at least one of following parameters of a display form of the graphical identifier according to the distance: a color, a brightness, a transparency and a dynamic effect of the graphical identifier.

2. The information processing method as claimed in claim 1, further comprising: detecting a current orientation of the virtual character in the game scene, and marking the current orientation on the direction indicator.

3. The information processing method as claimed in claim 2, wherein marking the current orientation on the direction indicator comprises:
   displaying an orientation indication control on the GUI, and controlling the direction indicator to move according to the current orientation, such that a position corresponding to the current orientation on the direction indicator is at a position indicated by the orientation indication control.

4. The information processing method as claimed in claim 1, wherein the direction identifier comprises at least one of the following: a direction scale and a direction descriptor.

5. The information processing method as claimed in claim 1, wherein the direction information comprises: absolute direction information of the marking location in the game scene.

6. The information processing method as claimed in claim 1, wherein the method further comprising:
   marking the marking location on the thumbnail.

7. The information processing method as claimed in claim 1, further comprising:
   providing a marking location eliminating control on the GUI; and
   in response to a trigger operation acting on the marking location eliminating control, eliminating the marking location and the graphical identifier corresponding to the marking location.

8. An electronic device, comprising:
   at least one processor, and
   at least one memory, configured to store at least one executable instruction of the at least one processor,
   wherein the at least one processor is configured to execute the at least one executable instruction to perform the information processing method as claimed in claim 1.

9. The information processing method as claimed in claim 1, wherein when a space of the GUI is limited, a direction descriptor displayed on a leftmost side of the direction indicator all the time indicates a left rear area of an area behind the virtual character, and a direction descriptor displayed on a rightmost side of the direction indicator all the time indicates a right rear area of the area behind the virtual character, and the direction descriptor displayed on the leftmost side of the direction indicator and the direction descriptor displayed on the rightmost side of the direction indicator are scale areas except for details of partial scale area in the direction indicator.

10. The information processing method as claimed in claim 1, wherein the method further comprises:
   detecting a preset operation on the thumbnail of the game scene displaying the thumbnail information of the partial game scene, opening the thumbnail of the game scene displaying the thumbnail information of the entire game scene, and detecting the location marking operation on the thumbnail of the game scene displaying the thumbnail information of the entire game scene.

11. The information processing method as claimed in claim 1, wherein the location marking operation comprises at least of following manners: a click touch operation, a double click touch operation, a long-press touch operation, and a pop touch operation; the GUI further comprises: a moving control area for controlling movement of the virtual character, a skill control for controlling skill release.

12. A non-transitory computer-readable storage medium, on which at least one computer program is stored, wherein the at least one computer program is executed by at least one processor to implement the following steps:

providing a direction indicator on a GUI, the direction indicator comprising a direction identifier for identifying a direction, wherein contents rendered on the GUI at least partially comprising a thumbnail of the game scene used for displaying thumbnail information of an entire or partial game scene;

detecting a location marking operation on the thumbnail, determining a marking location in the game scene according to a position of the location marking operation on the thumbnail, and acquiring direction information of the marking location; and at a position of the direction indicator corresponding to the direction identifier corresponding to the direction information, generating a graphical identifier corresponding to the marking location;

wherein the GUI displays the thumbnail of the game scene as a same time as showing the direction indicator and the game scene;

wherein when the direction information comprises a relative direction information of the marking location relative to the virtual character, the method further comprises: acquiring a relative distance of the marking location determined by the position of the location marking operation on the thumbnail relative to the virtual character, and controlling at least one of following parameters of a display form of the graphical identifier according to the distance: a color, a brightness, a transparency and a dynamic effect of the graphical identifier.

13. The non-transitory computer-readable storage medium as claimed in claim 12, wherein the at least one computer program is executed by the at least one processor to further implement the following steps: detecting a current orientation of the virtual character in the game scene, and marking the current orientation on the direction indicator.

14. The non-transitory computer-readable storage medium as claimed in claim 13, wherein the at least one computer program is executed by the at least one processor to further implement the following steps:

displaying an orientation indication control on the GUI, and controlling the direction indicator to move according to the current orientation, such that a position corresponding to the current orientation on the direction indicator is at a position indicated by the orientation indication control.

15. The non-transitory computer-readable storage medium as claimed in claim 12, wherein the direction identifier comprises at least one of the following: a direction scale and a direction descriptor.

16. The non-transitory computer-readable storage medium as claimed in claim 12, wherein the direction information comprises: absolute direction information of the marking location in the game scene.

17. The non-transitory computer-readable storage medium as claimed in claim 12, wherein the at least one computer program is executed by the at least one processor to further implement the following step:

marking the marking location in the game scene thumbnail.

18. The non-transitory computer-readable storage medium as claimed in claim 12, wherein the at least one computer program is executed by the at least one processor to further implement the following steps:

providing a marking location eliminating control on the GUI; and in response to a trigger operation acting on the marking location, eliminating control is detected, eliminating the marking location and the graphical identifier corresponding to the marking location.

* * * * *